United States Patent [19]
Cocito

[11] 4,171,867
[45] Oct. 23, 1979

[54] DEVICE FOR AND METHOD OF SPLICING FIBER-OPTICAL CABLES

[75] Inventor: Giuseppe Cocito, S. Giusto Canavese, Italy

[73] Assignee: CSELT - Centro Studi e Laboratori Telecomunicazioni S.P.A., Turin, Italy

[21] Appl. No.: 853,851

[22] Filed: Nov. 22, 1977

[30] Foreign Application Priority Data
Nov. 25, 1976 [IT] Italy .................. 69806 A/76

[51] Int. Cl.² .................................. G02B 5/14
[52] U.S. Cl. .................... 350/96.21; 29/526 R
[58] Field of Search ........... 350/96.21, 96.20, 96.22, 350/96.24, 96.15, 96.29; 29/526

[56] References Cited
U.S. PATENT DOCUMENTS

| | | | |
|---|---|---|---|
| 3,871,744 | 3/1975 | Bridger et al. | 350/96.21 |
| 3,883,681 | 5/1975 | Campbell | 350/96.20 |
| 4,057,448 | 11/1977 | Miller | 350/96.21 |

*Primary Examiner*—Stewart J. Levy
*Attorney, Agent, or Firm*—Karl F. Ross

[57] ABSTRACT

One or more optical fibers, forming part of a cable for the transmission of luminous signals, are divided into sheathed sections spliced together inside a junction box having opposite walls provided with a pair of nipples in which the incoming and outgoing cable portions are resiliently clamped. Between these nipples the two sections of each fiber, partly stripped of their sheaths, are bent into a loop along which they are joined together by a sleeve. Adjacent fiber loops of the same cable can be separated within the box by interposed sheets. The loops not only relieve stresses on the bared fiber ends but also facilitate the equalization of ray paths in a multifiber optical cable.

8 Claims, 3 Drawing Figures

DEVICE FOR AND METHOD OF SPLICING FIBER-OPTICAL CABLES

FIELD OF THE INVENTION

My present invention relates to a method of and means for splicing an optical cable comprising one or more light-conducting fibers.

BACKGROUND OF THE INVENTION

For the transmission of luminous signals over long distances, such an optical cable must be made up from two or more portions properly interconnected to provide the necessary optical and mechanical continuity. Such interconnection requires the individual splicing of pairs of fiber sections from respective cable portions, with preliminary stripping of the usual protective sheath from the light-conducting core of each fiber section in the vicinity of its free end. Generally, however, the bare fiber extremity has little mechanical strength so as to be susceptible to rupture under stress; this is true even if the interconnected fiber ends are again covered by a protective layer.

It is therefore not practical to connect such fiber sections by simply inserting their bare extremities from opposite ends into a coupling sleeve in accordance with conventional techniques.

In a multifiber cable, moreover, it is often important to equalize the lengths of the light paths constituted by the several fibers in order to prevent a relative dephasing of the signals conveyed thereby. With straight-line fiber sections spliced in the aforementioned manner, subsequently detected phase differences may be difficult to correct.

OBJECTS OF THE INVENTION

The principal object of my present invention, therefore, is to provide a method of and means for splicing such optical cables with substantial elimination of the risk of rupture at the fiber joints.

Another object is to provide a method of splicing a multifiber cable which facilitates the equalization of the several light paths.

It is also an object of my invention to provide a device which forms a fluidtight junction for interconnected portions of an optical cable, for the purpose of protecting its fiber or fibers from atmospheric moisture and, possibly, for allowing the cable joint to be enveloped by a stabilizing fluid under pressure.

SUMMARY OF THE INVENTION

In accordance with my present invention, the cable portions to be spliced are engaged at points spaced from the free ends of their respective fiber sections by relatively fixed supporting means between which the fiber sections, with their free ends bared, are bent into a closed loop, these free ends being interconnected substantially midway of the loop.

Since the light transmissivity of an optical fiber is not significantly affected by a bending of that fiber with a radius of curvature many times greater than its thickness, such a looping does not interfere with the conveying of luminous signals. Moreover, as each fiber is firmly held on opposite sides of the loop at points separated by an invariable distance, the loop is virtually free from stresses other than the force of gravity, being able to expand or contract with changing temperatures. Inasmuch as the diameter of the loop is not critical, its length could be reduced if tests performed after the completion of the joint show an undesirable phase shift relative to associated signal paths such as those of adjoining fibers.

According to a more particular feature of my invention, the points of support for the incoming and outgoing cable portions are formed by holders on opposite walls of a preferably fluidtight box enclosing the loop.

BRIEF DESCRIPTION OF THE DRAWING

The above and other features of my invention will now be described in detail with reference to the accompanying drawing in which.

SPECIFIC DESCRIPTION

Figure 1:
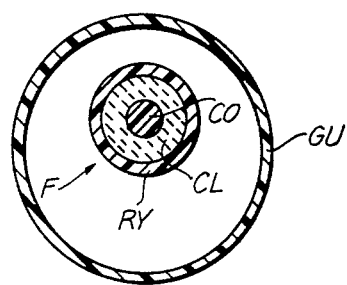
FIG. 1 is a magnified and somewhat diagrammatic cross-sectional view of an optical cable to which the invention is applicable.

In FIG. 1 I have shown an optical cable comprising a light-conducting fiber F surrounded by an outer sheath GU. The fiber F consists of a light-transmissive core CO having a coating CL of different refractive index, designed to enhance the reflection of light rays at the core periphery, and an opaque outer covering RY which serves as a mechanical reinforcement for the core and also protects its outer surface from scratches liable to mar its optical performance. It should be understood, however, that coating CL could be omitted, with covering RY adhering directly to the core CO, or that this covering may be eliminated. In some instances the bare core CO may be enveloped only by the sheath GU. It will also be understood that sheath GU could accommodate a bundle of parallel fibers F conveying the same signal; for purposes of this description, such a bundle may be considered the equivalent of a single fiber.

Figure 2:
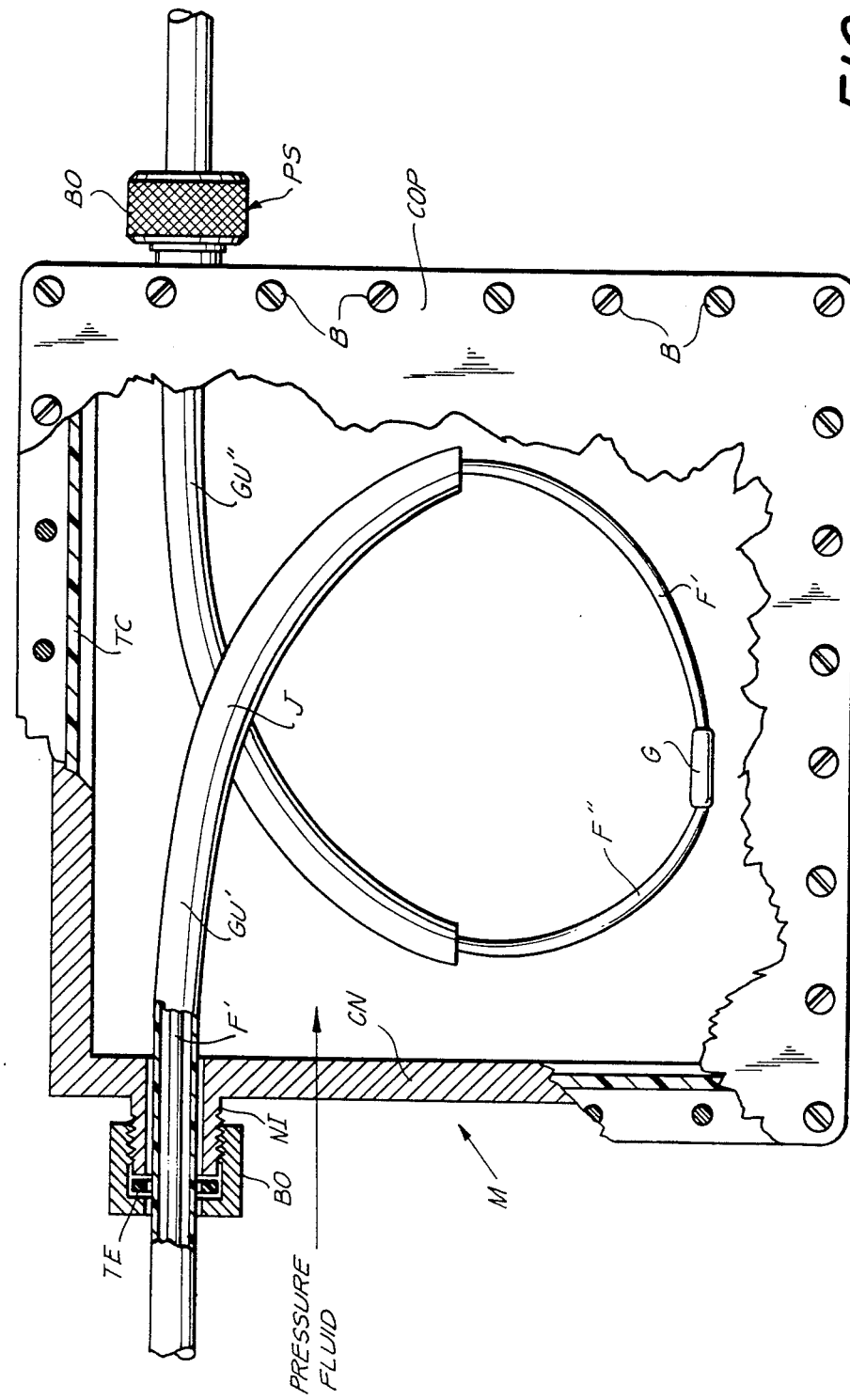
FIG. 2 is a side view of a junction box according to my invention, with parts broken away to show the splicing of a single-fiber optical cable.

FIG. 2 shows a junction box M for the splicing of two portions of an optical cable of the type illustrated in FIG. 1, these portions having cores F', F'' (with or without layers CL and/or RY) surrounded by sheaths GU', GU''. Box M, which could accommodate several such cables alongside one another, comprises a container body CN with an open side to which a lid COP is fastened by bolts B. The joint between the container body and the lid is made fluidtight by an interposed rectangular gasket TC. As indicated, a liquid or gas under pressure may occupy its interior.

Container body CN is provided on opposite sidewalls with a pair of substantially identical cable clamps or glands PS each comprising a threaded nipple NI engaged by a knurled cap nut BO with interposition of a resilient gasket TE. Sheaths GU' and GU'' of the two interconnected cable portions are firmly but resiliently held in these clamps by the compressed gaskets TE thereof forming a fluidtight seal around them.

Inside box M the sheaths GU' and GU'' are stripped away from the cores F' and F'' in the vicinity of their free ends which are interconnected by a coupling sleeve G in abutting relationship to form an optically continuous light path. Sleeve G is shown to be positioned approximately at the center of a closed loop formed by letting the two cable portions curve in opposite directions, over an arc of roughly 180°, from a point of intersection J.

Figure 3:
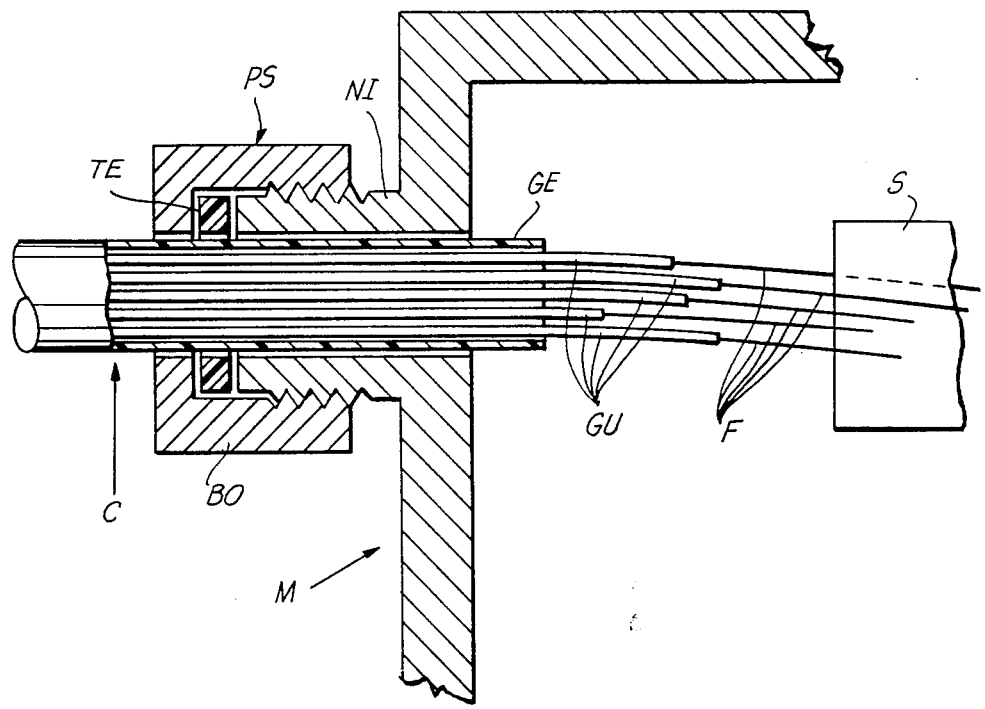
FIG. 3 is a sectional view of part of another junction box according to my invention, used for the splicing of a multifiber cable.

In FIG. 3 I have shown a similar junction box M with a clamp PS gripping an optical cable C of the multifiber type, that cable comprising an outer envelope GE surrounding a set of fibers F with individual protective sheaths GU. Each fiber F (which could also consist of a fiber bundle as discussed with reference to FIG. 1) is connected to its extension in an outgoing cable portion via an individual closed loop as illustrated in FIG. 2, again with the use of a coupling sleeve positioned substantially midway along the loop. The several loops with their coupling sleeves lie in generally parallel planes and could be separated from one another by interposed sheets S of paper, for example, to prevent any entanglement. It will be understood that the box could lie flat on one of its major sides, with the loops stacked one atop the other and the sheets S inserted horizontally therebetween.

The foreshortening of the sheaths GU', GU'' on both sides of the connector G eliminates any stresses due to the differences in the coefficients of expansion of these sheaths and the cores F', F''. In this context it is particularly advantageous to terminate the two sheaths roughly half-way between their point of intersection J and the joint formed by the connector G, this arrangement giving the necessary stability to the loop while freely allowing the exposed fiber extremities to contract or expand with changing temperatures. Such dimensional changes, moreover, are in no way inhibited by the resilient clamping of sheaths GU', GU'' (or GE in FIG. 3) in their holders PS.

Coupling sleeve G may be any conventional connector for the splicing of optical fibers, e.g. a device of the type shown in U.S. Pat. No. 4,057,448.

I claim:

1. A device for splicing together sections of at least one light-conducting fiber forming part of respective portions of an optical cable, each of said sections being provided with a surrounding sheath, comprising:

relatively fixed supporting means engaging said portions at points spaced from the ends of their respective fiber sections; and junction means engaging said sections at their free ends for establishing a continuous light path therebetween, said sections being bent into a closed loop with said sheaths stripped away in the vicinity of said junction means, the latter being positioned substantially midway of the loop.

2. A device as defined in claim 1, further comprising a box enclosing said loop, said supporting means including a pair of holders on opposite walls of said box.

3. A device as defined in claim 2 wherein said holders comprise a pair of nipples provided with cap nuts and resilient gaskets compressed between said nipples and said cap nuts for elastically gripping said portions.

4. A device as defined in claim 2 wherein said holders form fluidtight joints around said portions, said box being filled with a fluid under pressure.

5. A method of splicing together sections of at least one light-conducting fiber forming part of respective portions of an optical cable, each of said sections being provided with a surrounding sheath, comprising the steps of supporting said portions at relatively fixed points spaced from the free ends of their respective fiber sections, stripping said sheath from each fiber section in the vicinity of its free end, coiling said fiber sections into a closed loop between their points of support, and interconnecting their free ends substantially midway of said loop.

6. A method as defined in claim 5 wherein the cable includes a plurality of individually sheathed fiber sections in each of said portions, corresponding fiber sections of said portions being interconnected in separate loops.

7. A method as defined in claim 6, comprising the further step of interposing separating sheets between adjoining loops.

8. A method as defined in claim 5 wherein each sheath is cut away approximately half-way between a point of intersection with the opposite sheath and the interconnected free ends.

* * * * *